United States Patent [19]

Moellering et al.

[11] Patent Number: 5,283,858
[45] Date of Patent: Feb. 1, 1994

[54] CONTINUOUS HIERARCHICAL SLOPE-ASPECT COLOR DISPLAY FOR PARAMETRIC SURFACES

[75] Inventors: Harold J. Moellering, Columbus, Ohio; A. Jon Kimerling, Corvallis, Oreg.

[73] Assignee: The Ohio State University Research Foundation, Columbus, Ohio

[21] Appl. No.: 495,564

[22] Filed: Mar. 16, 1990

Related U.S. Application Data

[63] Continuation-in-part of Ser. No. 331,929, Mar. 31, 1989, Pat. No. 5,067,098.

[51] Int. Cl.$^5$ .................. G06F 15/62; G09B 29/12
[52] U.S. Cl. .................................. 395/126; 395/131; 434/152
[58] Field of Search ............... 340/701, 703; 434/150, 434/152; 364/522, 521, 518; 395/126, 131, 129, 119

[56] References Cited

U.S. PATENT DOCUMENTS

| | | | |
|---|---|---|---|
| 4,148,580 | 4/1979 | Hill, Sr. | 434/152 X |
| 4,821,212 | 4/1989 | Heartz | 364/521 |
| 4,868,771 | 9/1989 | Quick et al. | 364/522 X |
| 4,970,699 | 11/1990 | Bucker et al. | 340/701 X |

OTHER PUBLICATIONS

Eastman, "Opponent Process Theory and Syntax for Qualitative Relationships in Quantitative Series", *The American Cartographer* 13, 4:pp. 324–333.

Primary Examiner—Raymond J. Bayerl
Attorney, Agent, or Firm—Frank H. Foster

[57] ABSTRACT

A method for generating an image of a parametric surface, such as the aspect of terrain which maximizes color contrast to permit easy discrimination of the magnitude, ranges, intervals or classes of a surface parameter while making it easy for the user to visualize the form of the surface, such as a landscape. The four pole colors of the opponent process color theory are utilized to represent intervals or classes at 90 degree angles. The color perceived as having maximum measured luminance is selected to portray the color having an azimuth of an assumed light source and the color showing minimum measured luminance portrays the diametrically opposite azimuth. The 90 degree intermediate azimuths are portrayed by unique colors of intermediate measured luminance, such as red and green. Colors between these four pole colors are used which are perceived as mixtures or combinations of their bounding colors and are arranged progressively between their bounding colors to have perceived proportional mixtures of the bounding colors which are proportional to the interval's angular distance from its bounding colors.

6 Claims, 10 Drawing Sheets

RELATIVE LUMINANCES OF COLORS SELECTED FOR A 32 CLASS ASPECT MAP.

HUE AND LIGHTNESS VALUES FOR THE 32 ASPECT CLASS COLORS DETERMINED BY VISUAL BISECTIONING AND COSINE CURVE MATCHING

| CLASS | HUE | LITE. | CLASS | HUE | LITE. | CLASS | HUE | LITE. |
|---|---|---|---|---|---|---|---|---|
| 1 | 0 | 40 | 12 | 160 | 50 | 23 | 215 | 45 |
| 2 | 25 | 40 | 13 | 165 | 50 | 24 | 225 | 42.5 |
| 3 | 40 | 40 | 14 | 172 | 50 | 25 | 240 | 40 |
| 4 | 52 | 40 | 15 | 175 | 50 | 26 | 260 | 37.5 |
| 5 | 60 | 40 | 16 | 178 | 50 | 27 | 290 | 35 |
| 6 | 78 | 42.5 | 17 | 180 | 50 | 28 | 300 | 32.5 |
| 7 | 90 | 45 | 18 | 182 | 50 | 29 | 310 | 37.5 |
| 8 | 107 | 47 | 19 | 187 | 50 | 30 | 322 | 40 |
| 9 | 120 | 50 | 20 | 195 | 50 | 31 | 335 | 40 |
| 10 | 137 | 50 | 21 | 200 | 50 | 32 | 347 | 40 |
| 11 | 150 | 50 | 22 | 205 | 47.5 | | | |

RELATIVE LUMINANCES OF COLORS SELECTED FOR A 32 CLASS ASPECT MAP.

CONTINUOUS HIERARCHICAL SLOPE-ASPECT COLOR DISPLAY FOR PARAMETRIC SURFACES

This invention was made with government support under Contract NAGW-973 awarded by NASA. The government has certain rights in this invention.

This application is a continuation-in-part of application Ser. No. 07/331,929, filed Mar. 31, 1989, now U.S. Pat. No. 5,067,098.

TECHNICAL FIELD

This invention generally relates to a solution to the slope aspect problem. The invention relates to the visual display of two or three dimensional parametric surfaces in a manner which enhances the viewer's visualization of a three dimensional surface form while presenting the parametric data in an accurately readable form for the presentation of cartographic, geographic, and a broad variety of other spatial parametric data.

BACKGROUND ART

Slope aspect information is widely used by earth scientists, environmental planners, and other analysts to represent a physical landscape. A terrain surface is commonly subdivided into an array of contiguous surface elements in which the position of each of these surface elements is defined by data specified in a two dimensional or three dimensional positional coordinate system. In addition to its positional coordinates, each surface element may be defined by a further parameter such as its slope aspect. The slope aspect may be generally defined as the compass direction toward which the maximum slope of the surface faces and more particularly may be defined as the compass direction or azimuth of the horizontal component of the gradient which is a line along the maximum slope of the surface element.

Although aspect is a continuum extending around the entire 360 degree universe of possible azimuths, it has long been deemed desirable to subdivide that 360 degree universe into a finite plurality of contiguous, angular aspect intervals or classes. For example, the 360 degrees may be subdivided into eight intervals of 45 degrees each or 16 intervals of 22.5 degrees each.

Slope aspect is a landscape characteristic which is fundamental to building site analysis, solar access planning, water shed management, and many other scientific and management activities. Although determining the aspect at a single location may be sufficient for addressing some problems, most problems require an understanding of the pattern of slope aspect variation across the landscape. Slope aspect maps provide such a desirable regional view and are required in many instances.

Slope aspect maps are frequently created using computers because aspect computation based upon an array of grid cells or elements in a digital elevation model is a straight forward and an efficient procedure which can be calculated from elevations of adjacent cells.

Cartographers have long used grey tones for standard terrain shading to illustrate the form of the terrain. This method simply determines the slope gradient normal for each surface element, assumes a light origin azimuth, conventionally 315 degrees, and then illuminates each element in a relatively lighter or darker grey tone as a function of the assumed illumination on the surface element as determined by its slope gradient normal, that is its angle relative to the light source.

One worker in the prior art has extended these principles to the presentation of slope aspect data utilized a cosine equation of illumination to determine the grey tone used to display each element as a function of aspect. If a grey scale is used with different grey tones, then the aspect of each element is displayed by the grey tone which represents the interval in which the element's aspect lies.

Although such a presentation of the data with such grey tones does permit general qualitative visualization of the surface slopes, the grey tones are perceived as implying magnitude variations. That is not appropriate for a display of slope aspect data.

Prior art workers have attempted to overcome this problem by using the hue component of color to distinguish aspect classes or intervals. In order to uniquely define each aspect interval, prior art workers have assigned a different hue to each of the selected subdivided aspect intervals and then displayed each element by the hue assigned to the aspect interval in which that element's aspect lies. These prior art attempts at using hue have been successful in presenting the data in a manner in which the aspect interval or class for each element may be easily distinguished and determined. The spectral hues of red, orange, yellow, green, blue, violet, and mixtures thereof produce, on some maps, easily distinguishable classes in the map legend and within the map. These hues at varying levels of value and chroma have been randomly assigned to classes. Yellow and neighboring lighter hues have been used to represent virtually all aspect directions.

The difficulty with these prior art attempts is that, although they facilitate discrimination of the aspect classes, they do not present a map from which a human can perceive some correspondence between the display and the form of the terrain being represented.

Since the use of grey tones in the prior art has enabled the human visualization of underlying form from the display and since the presentation of colors have permitted the discrimination between slope aspect class data presented on a map, we made attempts to combine these two by overlaying or over printing the aspect colors on a relief shaded base map. The results, however, were disappointing because the presence of the grey tone shading inherently decreases the user's ability to distinguish among the classes and the presence of the variety of colors is confusing with respect to the relief displayed by the grey tone.

As a result, it is the purpose of the present invention to present a method for displaying aspect information in a manner which both allows easily perceived and accurate discrimination of individual classes or intervals of slope aspect while simultaneously facilitating the user's visualization of the underlying surface form. This enables the map user to easily determine the aspect class while implicitly perceiving the slope from the same display.

Thus, it is the principal object of the present invention to develop an element coloring scheme that will maximize color contrast among aspect interval classes while assisting the user to visualize the form of the underlying landscape.

The present invention draws upon the teachings of the opponent process color theory as explained, for example, in an article by J. R. Eastman in *The American Cartographer*, Vol. 13, No. 4, 1986, pp. 324–333.

BRIEF DISCLOSURE OF INVENTION

A different color is assigned to each aspect interval, for displaying elements which fall within that interval, in accordance with the principles of the present invention. In the present invention each color has a hue, saturation, and lightness combination selected by first assigning to the aspect interval which includes the light origin azimuth, typically northwest or 315 degrees, a first color which is perceived as being brighter than any of the other selected colors. The preferred color is yellow.

The diametrically opposite aspect interval is assigned a second color which is perceived as being darker than any of the other selected colors and preferably is blue. A third color, which is perceived as substantially different from the first two colors, is assigned to a third aspect interval which is orthogonal to the first and second intervals and this color is preferably red. A fourth color which is perceived as substantially different from the first three, and preferably is green, is assigned to the fourth aspect interval which is diametrically opposite from the third interval.

Colors which appear to be mixtures are then assigned to each of the remaining intervals. The color mixtures selected are those which are perceived as being combinations of the interval's bounding two of the first four colors. These remaining intervals are arranged progressively between their bounding colors to have perceived proportional mixtures of the bounding colors which are proportional to the interval's angular distance from the bounding colors.

Preferably these first four easily distinguishable colors are the four pole colors selected in accordance with the opponent process color theory. Thus, the aspect of the slope of each element is determined and used to display each element at its coordinate position on the image in the color assigned to its aspect interval.

This invention is a method for using color with aspect data to show both the aspect and the surface form and to do this utilizing only the position parameters and the aspect. It provides a perception of shaded terrain, while clearly and uniquely showing readily distinguishable aspect classes. This system can be used for any parametric data which can be represented by a surface.

BRIEF DESCRIPTION OF DRAWINGS

The file of this patent contains at least one drawing executed in color. Copies of this patent with color drawings will be provided by the Patent and Trademark Office upon request and payment of the necessary fee.

Figure 1:
FIG. 1 is an illustration of the present invention utilizing the four pole colors and illustrating a display and an aspect color legend.
Figure 1:
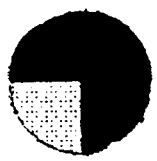

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

However, slope-aspect is a nominal level phenomenon because a particular aspect angle (i.e., azimuth or compass point) cannot be thought of as lesser or greater in physical magnitude or rank than any other aspect angle.

Hue and pattern differences are possible to use when graphically portraying nominal level area phenomena, with hue difference used more often, for example, in computer mapping and geographic information systems.

The set of hues which are selected for displaying slope-aspect should allow the map reader to easily distinguish among aspect classes and yet the aspect classes should form a circular progression where adjacency implies greater inherent similarity. In this manner perceived differences in colors create the perception of differences in aspects so that substantial differences in color represent substantial differences in aspect while near similarities in color represent near similarities in aspect.

We have found that the objects of the invention can be very effectively accomplished by applying certain principles of the opponent process color theory to the slope aspect problem.

In accordance with the opponent process color theory, humans perceive colors as four unique hues with all other hues appearing as mixtures of these four polar hues. This opponent process model of human vision is based on the idea that, although the cone cells in our eyes are sensitive to blue, green or red light, the ganglion cells linking the cones to the optic nerve interact to produce four perceptually unique colors—red, blue, green, and yellow. All other hues are seen as mixtures of these four pole colors, except that yellowish blues and reddish greens are not possible. These pole colors form a set of four maximally different hues which are therefore the easiest hues to distinguish from each other.

Under the present invention, these four pole colors are assigned to four 90 degree spaced aspect intervals. The aspect interval which contains and preferably is centered on the light origin azimuth, such as an artificially assumed sun, is assigned the pole color which is perceived as being brighter than any of the other selected colors. The conventional light azimuth is 315 degrees. This is preferably the pole color yellow from the opponent process color theory. The aspect interval or class which is diametrically opposite to that first aspect interval is a second color which is perceived as being darker than any of the other four selected colors which, in accordance with the opponent process color theory, is preferably the color blue. The third and fourth aspect intervals, which are orthogonal to the intervals of the first two, are each assigned colors which are perceived as being substantially different from the other three and are preferably red and green in accordance with the opponent process color theory.

Thus, for example, a four color system may be developed in accordance with the present invention in which all aspect angles between 0 degrees and 90 degrees are represented by green, between 90 degrees and 180 degrees are represented by blue, between 180 degrees and 270 degrees are represented by red, and between 270 degrees and 360 degrees are represented by yellow. An example of this is illustrated in FIG. 1.

These principles, however, are substantially improved if an eight class map is developed employing a circular progression of these four hues for displaying 45 degree wide aspect intervals or classes alternating with 45 degree wide aspect angle intervals or classes having the mixture colors of purple, blue-green, yellow-green, and orange. These eight hues will be seen as a circular progression of related colors with the mixture hues being perceived as inherently similar to the neighboring or bounding two pole colors between which they are positioned. This is illustrated in FIG. 2.

The system is further improved by utilizing 16 or more aspect angle intervals or classes where the intervals interposed between the four pole color intervals utilize colors which are perceived as being combinations of the interval's bounding two of the four pole colors and are arranged progressively between their bounding colors to have perceived proportional mixtures of the bounding colors which are proportional to the interval's angular distance from the pole colors. Thus, for example, the intervals between yellow and green appear to have proportionally more green and less yellow as their position is closer to the green and proportionally less green and more yellow as they are positioned more closely to yellow.

Figure 2:
FIG. 2 is an illustration of the present invention like FIG. 1, but utilizing eight aspect intervals or classes.
Figure 2:
Figure 3:
FIG. 3 is an illustration like FIGS. 1 and 2 but, utilizing sixteen aspect intervals or classes.
Figure 3:

This circular progression of related colors utilizing the four pole colors at 90 degree intervals is used to form an aspect color legend illustrated in FIGS. 1-3 with aspect angular intervals having an angle equal to the quotient of 360 degrees divided by the number of classes or intervals. The angles defining each interval and the color assigned to each interval may, for example, be simply stored in computer memory as a look-up table. When the aspect is determined for each surface element, the aspect can be compared to the stored aspect interval boundary angles to determine the aspect interval in which each element lies. Then the color assigned to that aspect interval is displayed at the coordinate position corresponding to the element on the image.

This manner of displaying an image provides a unified theory and method which utilizes features of the opponent process color theory and the cosine shading law to create both optimal slope aspect coloring schemes permitting distinctive slope aspect class discrimination while also depicting land forms in a manner similar to relief shading where, on north oriented maps, northwest facing slopes are lightened and southwest slopes are darkened and intermediate slopes appear to have an intermediate lightness or darkness proportional to their distance from northwest or southeast.

Since slope aspect alone is being mapped, the slope angle at each location is immaterial and can be assumed to be constant throughout. In this case the surface normal varies only with changes in aspect and the cosine function describes the theoretical reduction in surface brightness that occurs as the aspect angle deviates progressively from the northwest incident illumination. Surface brightness can be thought of as proportional to light emitted from phosphors on CRT screens, meaning that the cosine law can be extended to electronic map displays where measured screen luminance, scaled from zero to one hundred, can be used as a counterpart to surface brightness.

In this system yellow, the pole hue of highest inherent luminance and lightness, is used to display the aspect class centered on 315 degrees. Similarly blue, the opposite pole hue of lowest lightness, is best applied to the class centered on 135 degrees. Red and green can be used interchangeably for the aspect classes centered on 45 and 225 degrees.

Figure 7:
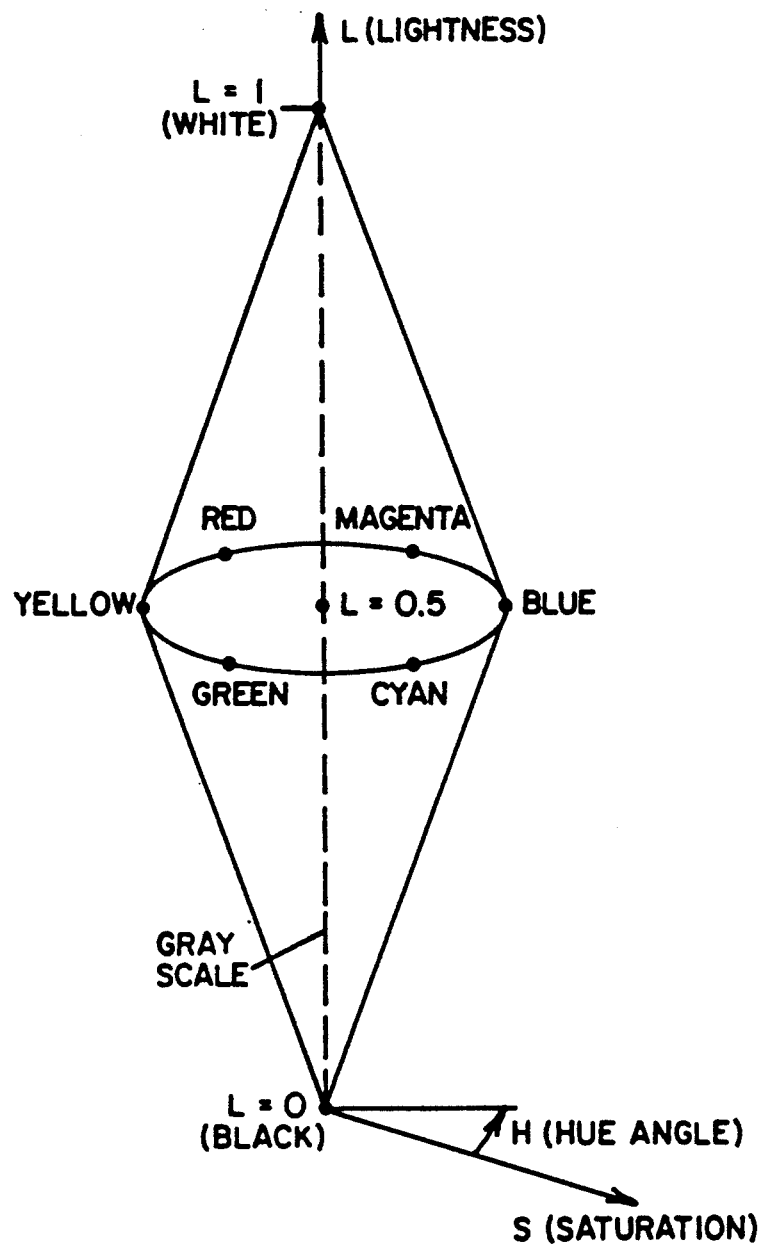
FIG. 7 illustrates the coordinates for the conventional hue-lightness-saturation color system.

The selection of the above poles and intermediate mixture hues, all with measured luminances close to falling on a cosine curve centered on yellow and scaled so that yellow equals one hundred and blue is zero, is somewhat subjective. FIG. 7 graphically illustrates the three principal coordinates for the hue-lightness-saturation color specification system with hue being designated as an angle about the central axis. We have found it desirable to maintain hue at maximum saturation permitted by the display apparatus being used. We have also found it desirable to maintain lightness in accordance with the equation:

$$L = 50[\cos(K-A)+1]$$

wherein
K is the illumination azimuth;
A is the azimuth of the element's aspect interval; and
L is the measured luminance on a scale of 0 to 100.

The hues selected for each aspect angle interval around the aspect color legend may be determined, in a simple system, by subdividing the universe of all hue angles in the HLS System into the number of intervals equal to the number of classes desired and utilizing the hue at the hue angle which is intermediate each such interval. We have found it advantageous, however, to adjust the hue angles for the selected hues so that they correspond to those described in the claims below. We have made these adjustments to compensate for the ways human perception differs from a regular angular progression about the hue angle space to obtain a result that the intermediate aspect intervals appear to be steps of uniform transition magnitudes.

Not only may different sequences of colors than those illustrated or preferred be used in accordance with the present invention, but they may be selected in accordance with other color systems. It is well known that there are several different color systems for describing color phenomena and that there are transformations known in the prior art for converting from one color system to the other to obtain equivalent results. There are, for example, such color systems as: the RGB System; the Munsell Hue-Value-Chroma System; the Hue-Intensity-Saturation System; the Shade-Tint-Tone System; the YIQ System, commonly used in television; and the Tektronix Hue-Value-Chroma (HVC) System, as well as any other additive or subtractive color system. Equivalent results may be obtained, although described in terms of one of these different color systems.

Figure 4:
FIG. 4 is an illustration of the present invention utilizing four aspect intervals or classes and showing a three dimensional illustration.
Figure 5:
FIG. 5 is an illustration like FIG. 4 but utilizing eight aspect intervals.
Figure 6:
FIG. 6 is an illustration like FIG. 4 but utilizing sixteen aspect intervals.
Figure 6:

Further, the principles of the present invention may be applied in both two dimensional or three dimensional images. For example, a simple image may be created utilizing two location parameters, such as X and Y in cartesian coordinates, with the slope aspect being portrayed by the selected color at each element location. A three dimensional image may also be created utilizing X, Y, and Z positional coordinates with the slope aspect determining the color for portraying each element. This is illustrated in FIGS. 4-6 for four, eight, and sixteen aspect interval classes respectively.

The present invention is not dependent upon or limited to a data variable which depicts the slope aspect of terrain. For example, the third positional parameter may be elevation, depth or other parameter such as population density. The present invention is also independent of the coordinate system which is used as well as the shape of the surface elements. It may be used, for example, with square, triangular, both regular and irregular, or other forms of cells or elements and with other surface coordinate systems, such as Euclidean, polar or spherical or spheroidal (such as latitude, longitude) coordinate systems or the many others which have been used by cartographers and others. The present invention is also independent of the kind of spatial data structure that is used to hold the surface specifications and data. These data structures could be from a wide variety of data structures such as the three basic families of spatial data structures, vector, raster or relational. The present invention is independent of whether the surface utilized is a discrete or continuous surface.

The present invention may also be applied to represent a variety of parametric surfaces. It would be applicable, for example, to systems in which two or three parameters can be represented as analogs to spatial parameters. The present invention may be used in connection with medical imaging, CAD-CAM Systems, spatial analysis, geography, geology, photogrammetry, climatology, meteorology, oceanography, remote sensing, cartography, terrain analysis, astronomy, physics, and social science data, such as population density or income distribution.

Furthermore, the method of the present invention is independent of the number of color categories, aspect intervals or classes with which it is used. Not only can they be greater in number than those illustrated, but could be infinite so that the color changes are presented as a continuum in which the hue angle to represent each aspect angle is simply a direct analog of the aspect angle rather than utilizing a progressive circular series of discrete aspect intervals.

The method is also independent of the angle assumed to be the angle of illumination.

Slope aspect maps colored according to the present invention appear to be relief shaded with land forms portrayed correctly and standing out clearly, but also accurately show the precise aspect interval or class at each location position on the image. The correct perception of land forms appears to enhance aspect recognition because, for example, northwest aspects are seen as falling on northwest trending hillsides. This synergistic effect is visible on standard planimetric as well as 3-D perspective slope aspect maps displayed in either single image or stereoscopic image mode on recently introduced terminals, such as the Tektronix 4126 CRT terminal or Tektronix 4337 work stations.

DETAILED DESCRIPTION OF FURTHER IMPROVEMENT

In the previous portion of this application we have explained that grey tones have been used in the past to give relief perception. Such grey shading has been done in accordance with the conventional, cosine illumination law to provide relief shading. The relative lightness of the grey is varied as a cosine function of the slope aspect azimuth. The result is that those surfaces appear darker which are oriented more away from the light source and those surfaces appear lighter which are oriented more toward facing the light source.

The problem with this system for generating relief images is that there is not much contrast which can be visibly perceived with varying grey tones and therefore the different data classes, represented by different aspect intervals, are difficult to perceive and distinguish from each other.

The prior art has used color in order to improve upon the contrast and thus improve the ability of the viewer to distinguish one aspect interval from another. This is possible because colors give more contrast than grey and thus enable the differing intervals or classes to be more easily distinguished from each other. The difficulty with the use of color in the past has been that the color systems which have been used do not provide any perception of relief. Thus, a prior art worker seeking to portray a surface, for example a geographical surface, has had to choose between giving the visual perception of depth by using grey shading or using color for the distinguishing of classes.

It is believed that some prior art workers have attempted to simultaneously use color to distinguish classes and use grey tones to give a relief effect on the same image by superimposing past color systems upon variations in grey. The results have been quite unsatisfactory because the colors have deteriorated or destroyed the relief perception and the grey tones have deteriorated the color contrast and therefore the ability of the observer to distinguish the classes. One reason the two cannot be used together is that, while the grey scale permits wide variation in lightness and can utilize large amounts of white light, with color this cannot be done because high lightness tends to wash out the colors, make them pale, and thus make them more difficult to distinguish from each other. The darker greys mask or darken the colors.

It is the purpose of the present invention to find a method which will allow the utilization of colors which are sufficiently vivid that they enhance the ability of the viewer to distinguish aspect classes and simultaneously provide a relief perception.

This invention involves the generation of an image on a two dimensional surface from which light is radiated to an observer. Such a two dimensional surface can be a CRT screen, wherein the light generated in the phosphors is radiated to the viewer, or it can be a hard copy in which reflected light is radiated to the viewer. The purpose of the invention is to provide an image having a three dimensional relief appearance for a three dimensional surface, which is illustrated on the two dimensional surface.

As in the past, a selected light origin azimuth is chosen and conventionally is 315 degrees. Also, as in the past, the three dimensional surface has been divided into an array of contiguous surface elements on a positional coordinate system. Each of the elements are defined by stored data, including at least two positional coordinate parameters and an additional parameter, such as elevation or, alternatively, slope-aspect azimuth.

An entire 360 degree universe of aspect azimuth is divided into a plurality of contiguous aspect intervals. These can be four aspect intervals or as many as 32, 128, or even an infinite number of infinitesimal azimuth intervals.

As in the prior art, a different color is assigned to each of the aspect intervals. However, unlike the prior art, the present invention begins with the advantages of the opponent process color theory by assigning the hue yellow to the aspect interval which includes the light origin azimuth, the hue blue to the diametrically opposite aspect interval, a hue to the third aspect interval, which interval is orthogonal to the first and second intervals, which hue is either red or green, and a hue to the fourth interval of either red or green, whichever is not used for the third interval.

Although there are many systems for describing and quantizing color phenomena, we utilize the HLS color system. However, the invention is not dependent upon the color system which is used, just as a description of an apparatus is not dependent upon the language, whether English or German, etc., in which it is expressed. Thus hues are described in terms of the HLS hue angle with lightness and saturation being the other two parameters for describing the characteristics of light in the HLS system.

In accordance with the present invention, colors are used which have substantially the maximum 100% saturation. We have found that maximum saturation provides the maximum hue contrast and thus maximizes the ability of the observer to distinguish the aspect classes.

We have also found that it is desirable to use colors having an intermediate lightness. The lightness should be approximately within the range of 25% to 60%, and we prefer not to go below 32.5% or above 50%. The reason is that colors of higher lightness appear pale and washed out and thus as the lightness goes higher, the colors are no longer vivid and contrast accordingly deteriorates. Similarly, at lower lightnesses the colors become darker and contrast deteriorates.

For a four class map, the four pole colors, described above, can be used, each representing an aspect interval of 90 degrees, centered preferably upon 315 degrees, 45 degrees, 135 degrees, and 225 degrees. However, it is desirable to provide maps conveying an image with considerably greater resolution and thus, it is preferable to have more, but smaller contiguous aspect intervals or classes.

We have extended the theory to such higher class maps. This has been done by subdividing the 360 degree universe of aspect intervals into a greater number of intervals and then examining the four aspect intervals which are intermediate the pole colors. A hue is selected having a hue angle intermediate the interval's bounding pole colors. A lightness for that hue angle is selected which approximates a cosine relationship with the slope aspect azimuth for that interval. Slight variations in hue and variations in lightness were then observed to select for each intermediate interval a hue angle and lightness which both gave the impression of a hue which was an equal mixture of its bounding pole hues and a lightness within the preferred lightness range, to maintain contrast, and yet approximating the cosine relationship.

This procedure was repeated for the four intervals intermediate all four pole colors, thus providing a total of 8 intervals. The process was then repeated for intervals intermediate each pole color and the intermediate color on each side of it. Further and further subdivisions were made, each time choosing for the color interposed between the bounding colors, a hue angle approximately intermediate the bounding hues, and having a lightness approximately having a cosine relationship to the slope aspect azimuth. This process of subdivision, choosing an intermediate hue angle and finding a lightness in the preferred range and like a cosine relationship, was continued until a total of 32 classes or intervals were determined for the entire 360 degree aspect azimuth universe. Thus, each of these 32 intervals represent 11.25 degrees. The values for each of these intervals are listed in FIG. 8.

Radiance, luminance, relative luminance and lightness all relate to how bright colors appear. Radiance and luminance are measured by an instrument such as a spectral photometer. Lightness is a quantization of the human perception of brightness. They are all, therefore, qualitatively similar.

The data for determining the lightness was obtained by measuring the luminance for each hue angle radiated from a cathode ray tube screen using a spectral photometer. The measured values were converted to a relative luminance by assigning the relative luminance of zero to the measured luminance of blue, because blue is the darkest color, and assigning the relative luminance of 100 to the measured luminance of yellow, because yellow is perceived as the brightest color. These values of relative luminance are plotted in FIG. 9 for the data of FIG. 8.

Figures 8, 9:
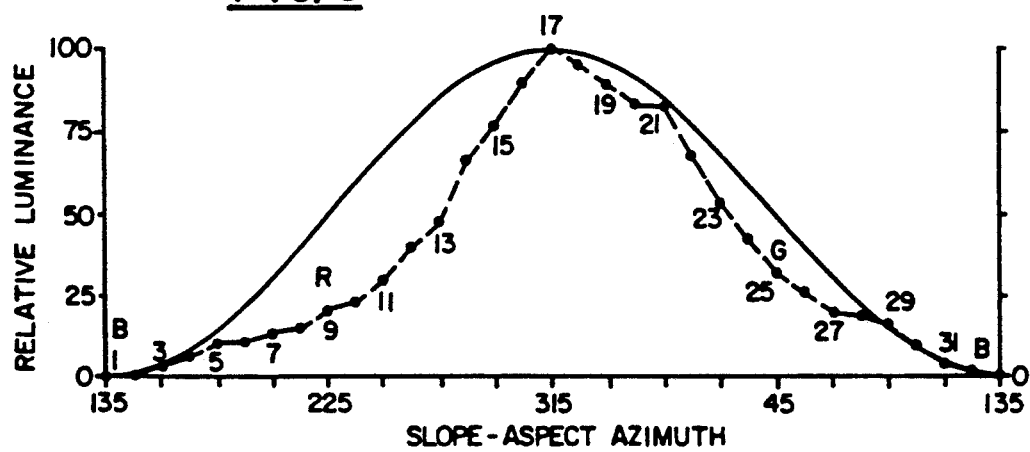
FIG. 8 is a table of data showing the preferred hue angle lightness for a 32 class aspect azimuth map.
FIG. 9 is a graph of the relative luminance for the data classes of FIG. 8.

The luminance over the entire preferred lightness range was actually measured for many of the hues. Then those which gave a relative luminance closest to the cosine curve, also illustrated in solid black lines in FIG. 9, were chosen without exceeding the preferred lightness range. Therefore, while it might appear that colors having a higher relative luminance than those of the data points illustrated on FIG. 9, might have been used to more closely approximate the cosine curve, such higher luminance values would have a lightness exceeding the desired range and therefore appear washed out and destroy the contrast. As a result, while the cosine curve is operable for grey relief shading, the curve of the inventors, plotted in FIG. 9, gives better images because it provides the maximum or optimal combination of contrast between the hues while simultaneously giving the appearance of relief shading.

Figure 10:
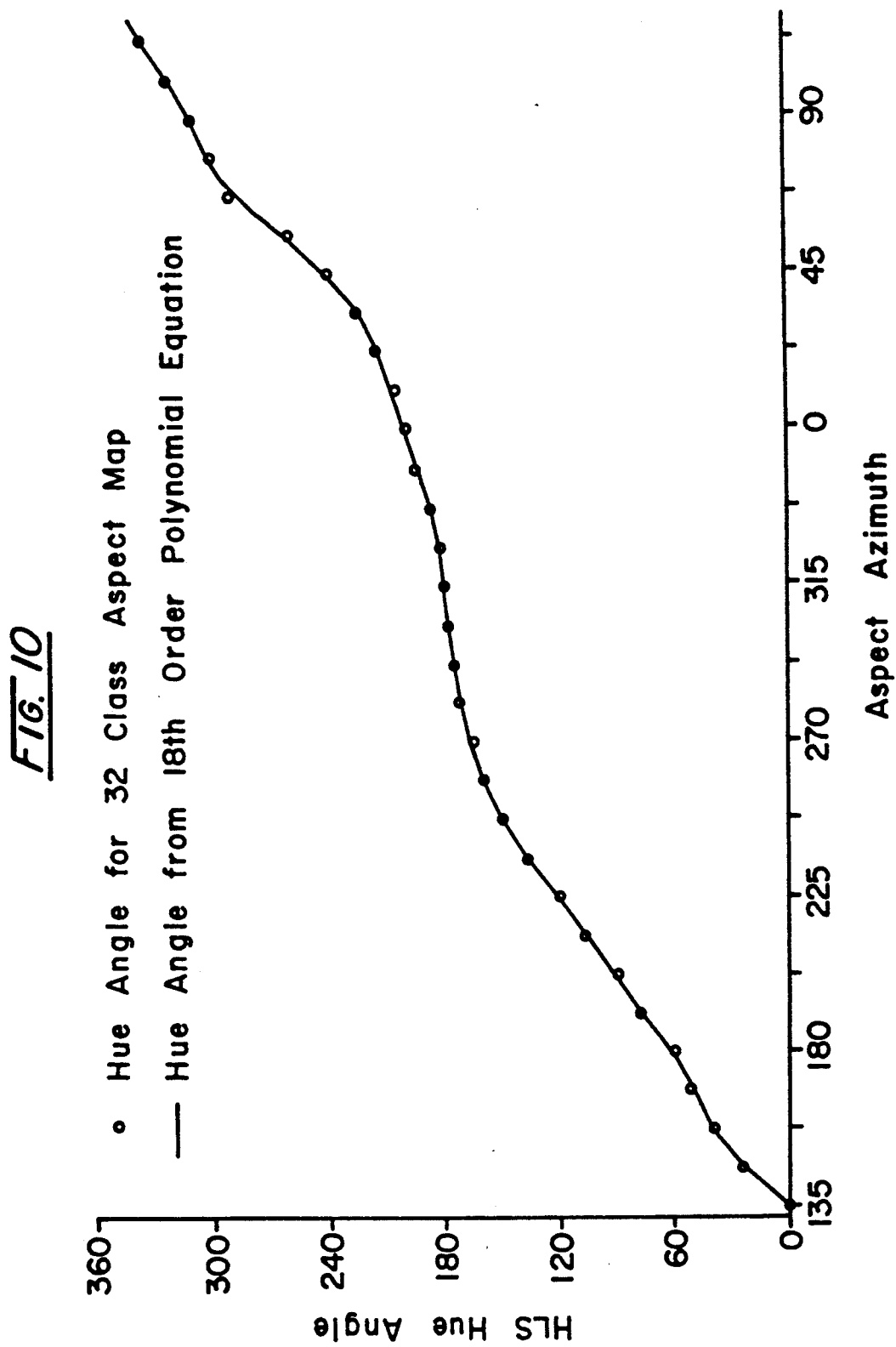
FIGS. 10 and 11 are graphs of the data of FIG. 8.

FIG. 10 is a plot of the same data illustrating the relationship of the HLS Hue Angle to the aspect azimuth. As can be seen, there is not a direct analogous one-to-one or proportional relationship between the HLS Hue Angle, designating the hue for a particular aspect interval, and the angle of that aspect interval.

Figure 11:
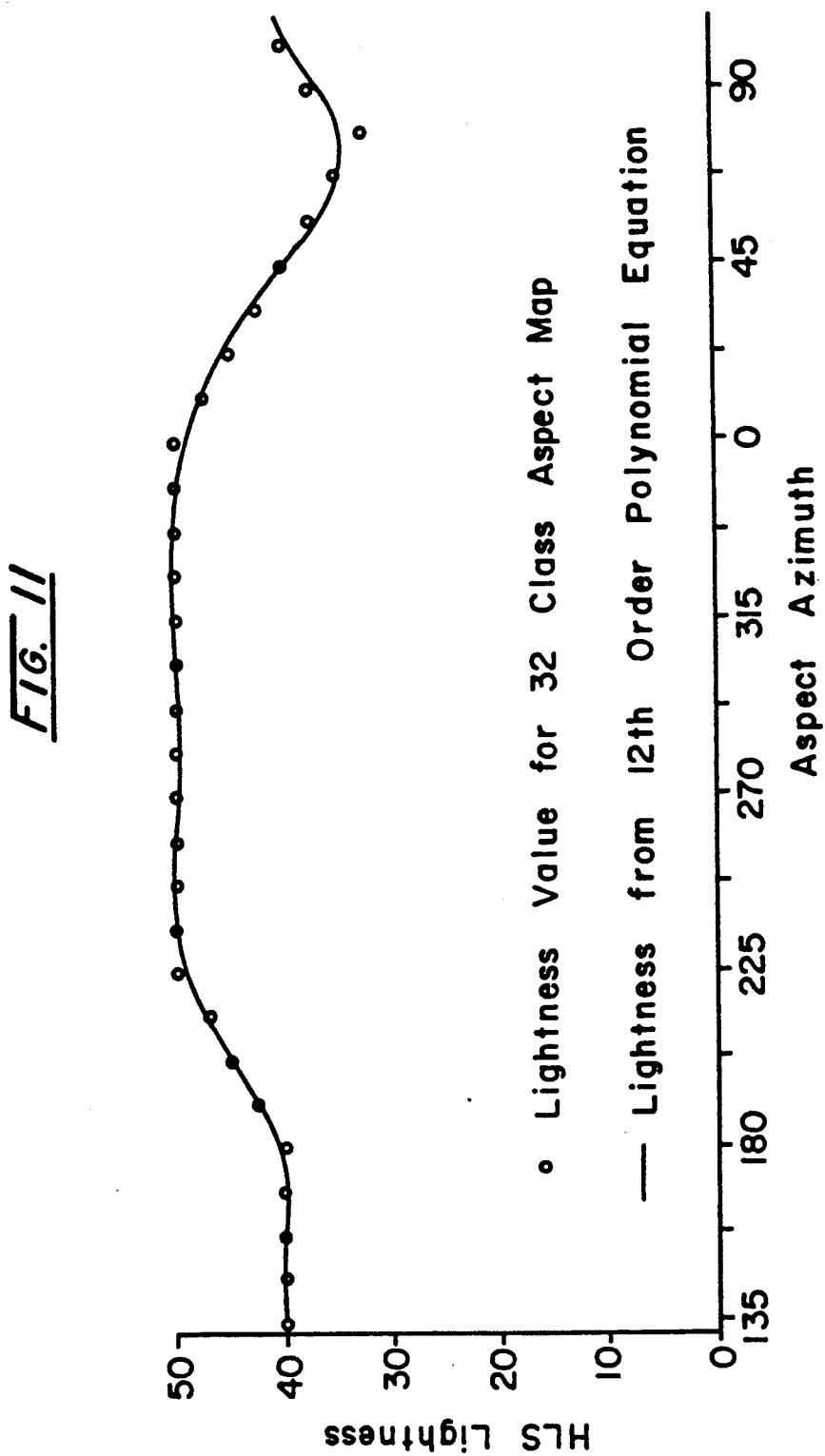

FIG. 11 is a graph of the same 32 data points illustrating the relationship of the lightness in the HLS system for each aspect azimuth interval or class.

The data represented in FIGS. 8-11, was interpolated to obtain a total of 128 data points to form that graph. Polynomial approximations of the graphs of FIGS. 10 and 11 were then developed so that values of hue angle and lightness can be selected for maps of any number of classes, including those greatly exceeding the ones which are portrayed in the graphs.

We found that the relationship of HLS lightness to aspect azimuth could be effectively and reasonably approximated by a 12th order Chebychef least square polynomial equation $$L = a_0 + a_1 X + a_2 X^2 + \ldots + a_{12} X^{12}$$

The hue angle could be effectively and reasonably approximated by an 18th order Chebychef polynomial of the form $$H = b_0 + b_1 X + b_2 X^2 + \ldots + b_{18} X^{18}$$

In these equations the a coefficients are

| Coefficients in least squares approximation: | |
| --- | --- |
| Coefficient 0: | 4.0498680337E + 01 |
| Coefficient 1: | −6.9074208763E − 01 |
| Coefficient 2: | 2.7493943410E − 01 |
| Coefficient 3: | −4.5949604837E − 02 |
| Coefficient 4: | 3.8521893686E − 03 |
| Coefficient 5: | −1.8156148579E − 04 |
| Coefficient 6: | 5.2798577876E − 06 |
| Coefficient 7: | −9.9867219289E − 08 |
| Coefficient 8: | 1.2553006583E − 09 |
| Coefficient 9: | −1.0423175394E − 11 |
| Coefficient 10: | 5.4977145743E − 14 |
| Coefficient 11: | −1.6690669933E − 16 |
| Coefficient 12: | 2.2204750359E − 19 | and the b coefficients are

| Coefficients in least squares approximation: | |
| --- | --- |
| Coefficient 0: | −1.2340955769E + 01 |
| Coefficient 1: | 1.5918047011E + 01 |
| Coefficient 2: | −5.2577909469E + 00 |
| Coefficient 3: | 1.4762975986E + 00 |
| Coefficient 4: | −2.4932375075E − 01 |
| Coefficient 5: | 2.6375874370E − 02 |
| Coefficient 6: | −1.8616153619E − 03 |
| Coefficient 7: | 9.2091248457E − 05 |
| Coefficient 8: | −3.3050300576E − 06 |
| Coefficient 9: | 8.8068473117E − 08 |
| Coefficient 10: | −1.7677423952E − 09 |
| Coefficient 11: | 2.6918355701E − 11 |
| Coefficient 12: | −3.1100242421E − 13 |
| Coefficient 13: | 2.7059463675E − 15 |
| Coefficient 14: | −1.7429332200E − 17 |
| Coefficient 15: | 8.0539630734E − 20 |
| Coefficient 16: | −2.5234936501E − 22 |
| Coefficient 17: | 4.7992697091E − 25 |
| Coefficient 18: | −4.1810540683E − 28 |

While certain preferred embodiments of the present invention have been disclosed in detail, it is to be understood that various modifications may be adopted without departing from the spirit of the invention or scope of the following claims.

We claim:

1. A method for generating an image, with a selected light origin azimuth, of a three dimensional surface which has been subdivided into an array of contiguous surface elements on a positional coordinate system, each of the elements being defined by stored data including at least two positional coordinate parameters and an additional parameter, the method comprising:
   (a) subdividing the entire 360 degree universe of aspect azimuth into a plurality of contiguous, angular aspect intervals;
   (b) assigning to each aspect interval a different color, each color having a hue, saturation which is the display maximum for all aspect intervals, and lightness combination selected by:
      (i) assigning to the aspect interval, which includes the light origin azimuth, a first color which is perceived as being brighter than any of the other selected colors,
      (ii) assigning to the diametrically opposite aspect interval a second color which is perceived as being darker than any of the other selected colors,
      (iii) assigning to a third aspect interval, which is orthogonal to the first and second intervals, a third color which is perceived as a substantially different color from the first two colors and of intermediate brightness,
      (iv) assigning to a fourth aspect interval, which is diametrically opposite the third interval, a fourth color which is perceived as a substantially different color from the first three colors and of intermediate brightness, and
      (v) assigning to each of the remaining intervals, colors which are perceived as being combinations of the interval's bounding two of said four colors and which are arranged progressively between the bounding colors to have perceived proportional mixtures of the bounding colors proportional to the interval's angular distance from them;
   wherein the colors are assigned in accordance with opponent process color theory principles wherein yellow, red, blue, and green are perceptual pole hues and the intermediate aspect interval hues are mixture hues;
   (c) determining the aspect of the slope of each element from said stored data and then determining for each element the aspect interval in which the element's aspect lies; and
   (d) displaying for each element, at its coordinate position on the image, the color assigned to its aspect interval wherein measured luminance L is in accordance with:

$$L = 50[\cos(K-A) + 1]$$

wherein:
   K is the illumination azimuth;
   A is the azimuth of the element's aspect interval; and
   L is the measured luminance on a scale of 0 to 100.

2. A method in accordance with claim 1 wherein K+315 degrees.

3. A method for generating an image on a two dimensional surface from which light is radiated to an observer to give a three dimensional relief appearance, the image having a selected light origin azimuth and representing a three dimensional surface which has been subdivided into an array of contiguous surface elements on a positional coordinate system, each of the elements being defined by stored data including at least two positional coordinate parameters and an additional parameter, the method comprising:
   (a) subdividing the entire 360 degree universe of aspect azimuth into a plurality of contiguous, angular aspect intervals;
   (b) assigning to each aspect interval a different color, each color having, in the HLS color system, a maximum saturation, an intermediate lightness, and a hue of:
      (i) yellow for the aspect interval, which includes the light origin azimuth, (ii) blue for the diametrically opposite aspect interval;
      (ii) a hue selected from red and green for a third aspect interval, which is orthogonal to the first and second intervals;
      (iv) the hue from red and green which is not selected for the third aspect interval for a fourth aspect interval, which is diametrically opposite the third interval; and (v) assigning to remaining, interposed intervals, colors which are perceived as being combinations of the interval's bounding two of said four colors and which are arranged progressively between the bounding colors to have perceived proportional mixtures of the bounding colors proportional to the interval's angular distance from them and having an intermediate lightness; wherein the lightness for each hue is selected to be approximately in the range of 25% to 60% and arranged approximately as a cosine function of its aspect interval, the cosine function having the peak lightness at yellow;

(c) determining the aspect of the slope of each element from said stored data and then determining for each element the aspect interval in which the element's aspect lies; and (d) displaying for each element, as its coordinate position on the image, the above assigned color for its aspect interval.

4. A method in accordance with claim 3 wherein the cosine peak at yellow is for the aspect interval of 315 degrees.

5. A method in accordance with claim 3 wherein each hue and lightness of the color for each interval has a value falling approximately upon a plot defined by connecting the following hue and lightness values for a 360 degree universe of aspect azimuths divided into 32 equal intervals:

| CLASS | HUE | LITE. |
|---|---|---|
| 1 | 0 | 40 |
| 2 | 25 | 40 |
| 3 | 40 | 40 |
| 4 | 52 | 40 |
| 5 | 60 | 40 |
| 6 | 78 | 42.5 |
| 7 | 90 | 45 |
| 8 | 107 | 47 |
| 9 | 120 | 50 |
| 10 | 137 | 50 |
| 11 | 150 | 50 |
| 12 | 160 | 50 |
| 13 | 165 | 50 |
| 14 | 172 | 50 |
| 15 | 175 | 50 |
| 16 | 178 | 50 |
| 17 | 180 | 50 |
| 18 | 182 | 50 |
| 19 | 187 | 50 |
| 20 | 195 | 50 |
| 21 | 200 | 50 |
| 22 | 205 | 47.5 |
| 23 | 215 | 45 |
| 24 | 225 | 42.5 |
| 25 | 240 | 40 |

-continued

| CLASS | HUE | LITE. |
|---|---|---|
| 26 | 260 | 37.5 |
| 27 | 290 | 35 |
| 28 | 300 | 32.5 |
| 29 | 310 | 37.5 |
| 30 | 322 | 40 |
| 31 | 335 | 40 |
| 32 | 347 | 40 |

6. A method in accordance with claim 3 wherein the hue and lightness of the color for each interval have a value approximately defined by the following in the HLS color system where the entire 360 degree universe of aspect azimuths is divided in 128 equal intervals, where X=the aspect interval and has values from 1 to 128, L=lightness and H=hue angle:

$$L = a_0 + a_1 X + a_2 X^2 + \ldots + a_{12} X^{12}$$

$$H = b_0 + b_1 X + b_2 X^2 + \ldots + b_{18} X^{18}$$

where the a coefficients are

| Coefficients in least squares approximation: | |
|---|---|
| Coefficient 0: | $4.0498680337E + 01$ |
| Coefficient 1: | $-6.9074208763E - 01$ |
| Coefficient 2: | $2.7493943410E - 01$ |
| Coefficient 3: | $-4.5949604837E - 02$ |
| Coefficient 4: | $3.8521893686E - 03$ |
| Coefficient 5: | $-1.8156148579E - 04$ |
| Coefficient 6: | $5.2798577876E - 06$ |
| Coefficient 7: | $-9.9867219289E - 08$ |
| Coefficient 8: | $1.2553006583E - 09$ |
| Coefficient 9: | $-1.0423175394E - 11$ |
| Coefficient 10: | $5.4977145743E - 14$ |
| Coefficient 11: | $-1.6690669933E - 16$ |
| Coefficient 12: | $2.2204750359E - 19$ | and where the b coefficients are

| Coefficients in least squares approximation: | |
|---|---|
| Coefficient 0: | $-1.2340955769E + 01$ |
| Coefficient 1: | $1.5918047011E + 01$ |
| Coefficient 2: | $-5.2577909469E + 00$ |
| Coefficient 3: | $1.4762975986E + 00$ |
| Coefficient 4: | $-2.4932375075E - 01$ |
| Coefficient 5: | $2.6375874370E - 02$ |
| Coefficient 6: | $-1.8616153619E - 03$ |
| Coefficient 7: | $9.2091248457E - 05$ |
| Coefficient 8: | $-3.3050300576E - 06$ |
| Coefficient 9: | $8.8068473117E - 08$ |
| Coefficient 10: | $-1.7677423952E - 09$ |
| Coefficient 11: | $2.6918355701E - 11$ |
| Coefficient 12: | $-3.1100242421E - 13$ |
| Coefficient 13: | $2.7059463675E - 15$ |
| Coefficient 14: | $-1.7429332200E - 17$ |
| Coefficient 15: | $8.0539630734E - 20$ |
| Coefficient 16: | $-2.5234936501E - 22$ |
| Coefficient 17: | $4.7992697091E - 25$ |
| Coefficient 18: | $-4.1810540683E - 28$ |

* * * * *

UNITED STATES PATENT AND TRADEMARK OFFICE
CERTIFICATE OF CORRECTION

PATENT NO. : 5,283,858
DATED : Feb. 1, 1994
INVENTOR(S) : Harold J. Moellering and A. Jon Kimerling It is certified that error appears in the above-indentified patent and that said Letters Patent is hereby corrected as shown below:

Column 12,
Claim 2, line 42, for "K + 315 degrees", substitute --K = 315 degrees--. Claim 3, subparagraph (b), line 64, for "(ii)", substitute --(iii)--.

Signed and Sealed this

Nineteenth Day of July, 1994

Attest:

BRUCE LEHMAN

*Attesting Officer*  *Commissioner of Patents and Trademarks*